United States Patent
Shchukin et al.

(10) Patent No.: US 7,234,921 B2
(45) Date of Patent: Jun. 26, 2007

(54) METHOD FOR INCREASING OPERATING EFFICIENCY OF THE ROTOR BLADE OF AN AEROGENERATOR (VARIANTS)

(75) Inventors: Iliya Lvovich Shchukin, ul.Dubninskaya, d.44, korpus 2, kv.46, Moscow (RU) 127591; Andrej Lvovich Shchukin, Moscow (RU); Semen Mikhajlovich Zelvinskij, Moscow (RU); Jurij Mikhajlovich Lipnitskij, Moscow (RU); Sergej Aleksandrovich Isaev, Sankt-Peterburg (RU)

(73) Assignee: Iliya Lvovich Shchukin, Moscow (RU)

( * ) Notice: Subject to any disclaimer, the term of this patent is extended or adjusted under 35 U.S.C. 154(b) by 42 days.

(21) Appl. No.: 10/540,933

(22) PCT Filed: Nov. 26, 2003

(86) PCT No.: PCT/RU03/00526

§ 371 (c)(1), (2), (4) Date: Jun. 29, 2005

(87) PCT Pub. No.: WO2004/059162

PCT Pub. Date: Jul. 15, 2004

(65) Prior Publication Data

US 2006/0088421 A1    Apr. 27, 2006

(30) Foreign Application Priority Data

Dec. 30, 2002    (RU) ............................... 2002135386

(51) Int. Cl.
  B64C 11/16    (2006.01)
(52) U.S. Cl. ..................... 416/1; 416/91; 416/236 R; 244/209

(58) Field of Classification Search ............... 416/1, 416/90 R, 91, 231 R, 231 B, 235, 236 R; 415/914; 244/209
See application file for complete search history.

(56) References Cited

U.S. PATENT DOCUMENTS 3,790,107 A    2/1974    Renshaw
5,417,391 A *  5/1995    Savitsky et al. ............ 244/209

FOREIGN PATENT DOCUMENTS

| EP | 0564662 A1 | 10/1993 |
| GB | 2186033 A * | 8/1987 |
| RU | 2015941 C1 | 7/1994 |
| RU | 2015942 C1 | 7/1994 |
| RU | 2032595 C1 | 4/1995 |
| SU | 1665882 A3 | 7/1991 |

* cited by examiner

Primary Examiner—Richard A. Edgar
(74) Attorney, Agent, or Firm—Banner & Witcoff, Ltd.

(57) ABSTRACT

A method for enhancing effectiveness of a rotor blade of a wind energy device (a wind-wheel of electric generating unit), according to which a rotor blade is implemented in the form of a thick-airfoil wing, and a vortex system for controlling the boundary layer is arranged on the rear portion of the blade, upon the leeward, which system consists of longitudinal cavities having central bodies that define annular channels; the air being sucked from the cavities and central bodies through air-intakes into receivers. The air from the receivers, under the action of centrifugal forces generated by the rotating blade, is sucked towards the blade end. Within the cavities and on the blade's outer surface are positioned the plates that restrict streaming-down of the air flow along the blade.

12 Claims, 3 Drawing Sheets

METHOD FOR INCREASING OPERATING EFFICIENCY OF THE ROTOR BLADE OF AN AEROGENERATOR (VARIANTS)

This application is a National Stage application of co-pending PCT application PCT/RU03/00526 filed Nov. 26, 2003, which was published in US under PCT Article 21(2) on Jul. 15, 2004, which claims the benefit of the RU Application No. 2002135386 filed Dec. 30, 2002. These applications are incorporated herein by reference in their entireties.

FIELD OF THE INVENTION

The invention relates to wind energy, in particular to wind energy devices (WED) converting wind energy into electrical, mechanical, hydraulic or other form of energy.

BACKGROUND OF THE INVENTION

A device for controlling the boundary layer is known, in which a method of enhancing the effectiveness of controlling the boundary layer on an aerodynamic surface (for example, on the surface of a rotor blade of a wind energy device) is realized by suction withdrawal of air from the rear wall of the cavity in combination with tangential blowing into an annular channel (see patent RU 2032595, IPC B 64 C 21/08, 10 Apr. 1995).

A drawback of the method for enhancing the effectiveness of a rotor blade is that such a vortex control of the boundary layer cannot be used for the rotor blades of a WED with a horizontal axis of rotation, since the vortex cells (cavities with central bodies), positioned along the geometrical axes of the blades, will not be transverse to the flow of air because of the powerful tangential flow of air formed during rotation of the rotor blades of the WED.

DISCLOSURE OF THE INVENTION

The object to the achievement of which the instant invention is directed is enhancement of the effectiveness of a WED by increasing the moment of force applied to the shaft of the rotor.

Achievement of the object is attained in the proposed method, in accordance with the invention, in that a rotor blade is made in the form of a wing with a thick aerodynamic profile and a vortex system for control of the boundary layer is arranged on the rear part of the blade opposite the side facing the wind, this system consisting of longitudinal cavities with central bodies forming annular channels, and suction withdrawal of air is carried out from each cavity and each central body through air vents into receivers, which are connected by air ducts to a low pressure receiver inside the blade, air from which due to centrifugal forces of a rotating blade and also because of the difference in pressure occurring at a blade shank and end of the blade because of the large sum velocity of the air at the end of the rotating blade, is sucked out to the end of the blade through an air duct, wherein plates limiting the air flow flowing off along the blade are mounted inside the cavity and on the outer surface of the blade with a certain spacing between them.

The low pressure receiver is combined with the cavity receivers and the receivers of the central bodies and suction withdrawal of the air takes place from it into the environment.

The low pressure receiver is combined with the cavity receivers and suction withdrawal of the air takes place from it and the receivers of the central bodies into the environment.

The low pressure receiver is combined with the receivers of the central bodies and suction withdrawal of the air takes place from it and the cavity receivers into the environment.

In order to optimize the value of the suction withdrawal of air from the low pressure receiver, from the cavity receivers and the receivers of the central bodies at different modes of rotation of the rotor of the WED and for effective neutralization of the action of excessively high speeds of the wind on the rotor of the WED, elements controlling the consumption of air are mounted on air lines.

In a variant of the method of enhancing the effectiveness of a rotor blade of a wind energy device, in accordance with the invention, a rotor blade is made in the form of a wing with a thick aerodynamic profile and a vortex system for control of the boundary layer is arranged on the rear part of the blade opposite the side facing the wind, this system consisting of longitudinal cavities, and suction withdrawal of air to the end of the blade is carried out from each cavity due to centrifugal forces of a rotating blade and also because of pressure difference occurring at the blade shank of the end of the blade because of high sum speed of air at the end of the rotating blade, wherein from each cavity through air vents with elements controlling air consumption suction withdrawal of air is carried out into a low pressure receiver, air from which due to centrifugal forces of a rotating blade and also due to pressure difference occurring at the blade shank and end of the blade as a result of a high sum speed of the air at the end of the rotating blade, is suction withdrawn to the end of the blade through an air line, plates to limit the air flow flowing off along the blade are mounted inside the cavity and on the outer surface of the blade with a certain spacing between them, suction withdrawal of air is also carried out due to a turbine, wherein air blown is carried out in the cortex rotating in the cavity of the blade.

BEST VARIANT OF CARRYING OUT THE INVENTION

Figure 1:
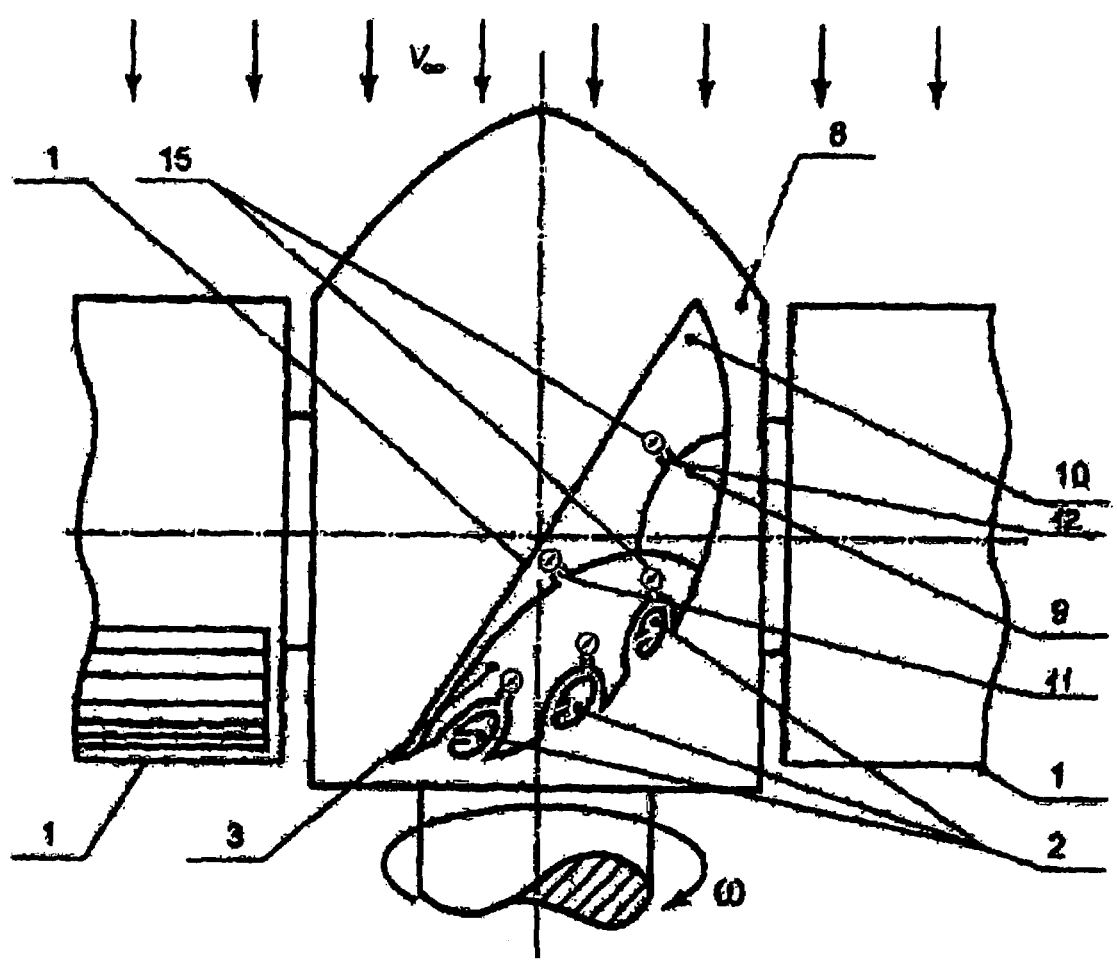
FIG. 1 shows a transverse cross-section of a rotor blade of a wind energy device.
Figure 2:
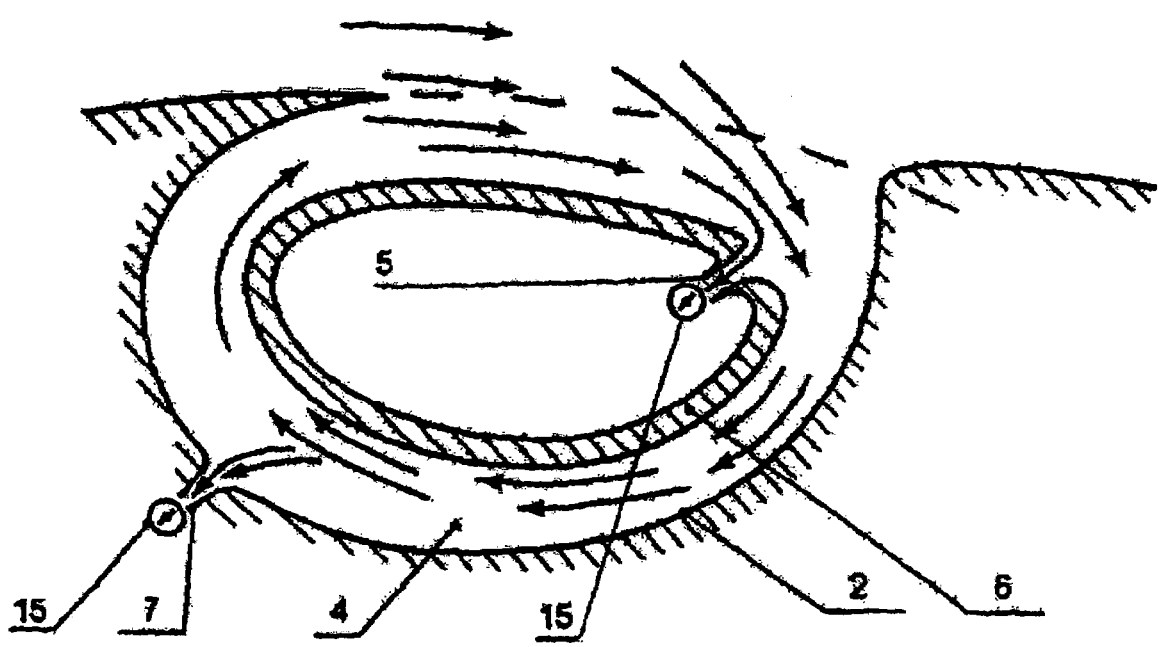
FIG. 2 shows a transverse cross-section of a cavity with a central body and a diagram of air flows.
Figure 3:
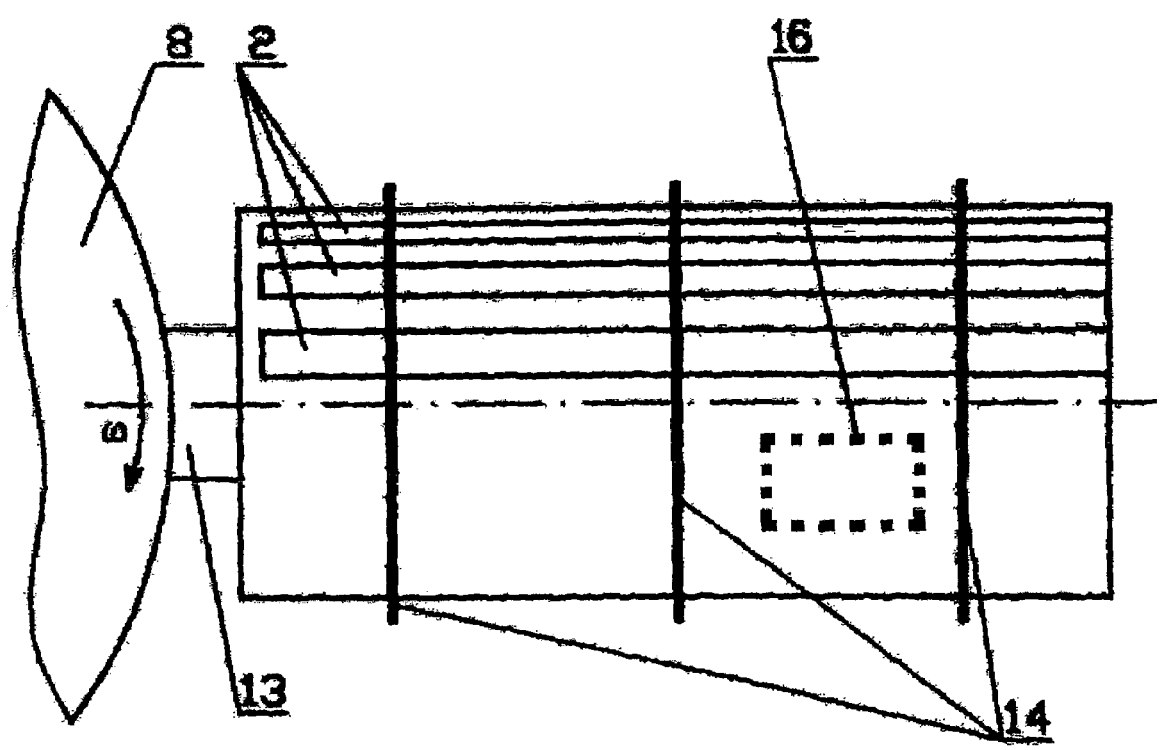
FIG. 3 shows a view of a blade from the side of vortex cavity and plates limiting the air flow flowing off along the blade.

In realization of the claimed method, blade 1 of a rotor of a wind energy device is made in the form of a wing with a thick aerodynamic profile (not shown) and a vortex system for control of the boundary layer is arranged on the rear part of the blade 1 at the side away from the wind, this system consisting of longitudinal cavities 2 with central bodies 6 forming annular channels 4 and air is suction withdrawn from each cavity 2 and each central body 6 through profiled air vents 7 and 5 into receivers 3 and 9, which are connected by air ducts 11 and 12 to a low pressure receiver 10 inside the blade 1, wherein the annular channel 4 has a wider portion in the front part.

The hollows of each of the cavities 2 is coupled to the receivers 3 with the aid of air vents 7, and the cavities of each of the central bodies 6 with the aid of air vents 5 to the receivers 9. Coupling the receivers 3 and 9 to the receiver 10 provides for dosage of the suction withdrawal of air from the cavities 2 and the central bodies 6 and reduces the unfavorable positive pressure gradient in the boundary layer.

Low pressure in the receiver 10 is provided during rotation of the blade 1 due to the tendency of the particles of air to move toward the end of the blade 1 as a result of the relatively low external pressure at the end of the blade 1 because of the high speed of the air flow (due to the vector addition of the air speed and the tangential flow), and also because of centrifugal forces.

Control of the suction withdrawal of air from the receiver 10 is carried out with the acid of elements 15 controlling air consumption. In order to withdraw the air from the receiver 10, a turbine 16 is additional installed. Furthermore, the blade 1 of the rotor contains a bushing 8 with a turning mechanism and cowling (which are not shown), blade shank 13, plate 14 limiting the flow of air along the blade 1 (counteracting the tangential flow of air occurring during rotation of the blade 1) and mounted on the external surface of the blade 1 and inside the cavity 2 "of the vortex cavities".

The nonstalling airflow of the rotating blade 1 is provided by the creation of stable vortexes in the annular channels 4 of the longitudinal cavities 2 positioned on the rear part of the blade 1, made in the form of a thick wing, at the side not facing the wind. Organization of the vortex and its support occur as a result of dosed suction withdrawal of air from the wall of the cavity 2 and the central body 6 "of the vortex cavity", wherein the necessary suction withdrawal of air is provided by centrifugal forces occurring during rotation of the WED rotor, and also by gas-dynamic vacuum pressure on the periphery of the blade 1.

INDUSTRIAL APPLICABILITY

Studies of the aerodynamic characteristics of the rotating blade 1 of the WED rotor with vortex cavity has shown that:
  in blades 1 with an active system for control of the boundary layer, a substantially greater part of the length of the blade 1 "works" on the creation of a torque on the shaft of a WED rotor;
  the value of the lifting force coefficient Cy is substantially greater than with ordinary WED blades;
  the positive value of the lifting force coefficient Cy is retained for a large range of negative angles of attack.

The constructive embodiment of the system for controlling the boundary layer may in some cases exclude the use of central bodies 6 inside the cavities 2.

Variants of the construction with use of blowing air in selected points of the cavity 2 are possible.

The constructive creation of the blades 1 of the rotor of a WED with a system of controlling the boundary layer provides the possibility of using a thick aerodynamic profile.

In the case where central bodies in the cavities, receivers of the central bodies, receivers of cavities and low pressure receivers are not present in the WED, the claimed method is realized without suction withdrawal of air from the central bodies into the receivers of central bodies through air vents, without the suction withdrawal of air from the cavities of the cavities into receivers of the cavities through air vents and without suction withdrawal of air from the low pressure receiver at the end of the blade, and suction withdrawal of the air from each cavity at the end of the blade is carried out due to centrifugal forces of the rotating blade and also due to the occurring difference in pressure at the blade shank and end of the blade because of the large sum speed of the air at the end of the rotating blade, wherein plates, limiting the air flow flowing off along the blade, are arranged with a definite spacing inside the cavity and on the external surface of the blade.

The claimed method is also realized in the presence of a low pressure receiver inside the blade, into which air is suction withdrawn from each cavity through air vents with elements controlling air consumption. Air is suction withdrawn from the low pressure receiver to the end of the blade.

A turbine for suction withdrawal of air may be additionally mounted in the device, and blowing the air may be carried out into a vortex rotating in a cavity of the blade.

The invention claimed is:

1. A method for enhancing effectiveness of rotor blade of wind energy device, characterized in that a rotor blade is made in the form of a wing with a thick aerodynamic profile and a vortex system for control of the boundary layer is arranged on the rear part of the blade opposite the side facing the wind, this system consisting of longitudinal cavities with central bodies forming annular channels, and suction withdrawal of air is carried out from the cavities and central bodies through air vents into receivers, which are connected by air ducts to a low pressure receiver inside the blade, air from which due to centrifugal forces of a rotating blade and also because of the difference in pressure occurring at a blade shank and end of the blade because of the large sum velocity of the air at the end of the rotating blade, is sucked out to the end of the blade through an air duct, wherein plates limiting the air flow flowing off along the blade are mounted inside the cavity and on the outer surface of the blade.

2. The method according to claim 1, characterized in that the low pressure receiver is combined with the cavity receivers and the receivers of the central bodies and suction withdrawal of air takes place from the low pressure receiver into the environment.

3. The method according to claim 1, characterized in that the low pressure receiver is combined with the cavity receivers and suction withdrawal of the air takes place from the low pressure receiver and the receivers of the central bodies into the environment.

4. The method according to claim 1, characterized in that the low pressure receiver is combined with the receivers of the central bodies and suction withdrawal of the air takes place from the low pressure receiver and the cavity receivers into the environment.

5. The method according to claim 1, characterized in that in order to optimize the value of the suction withdrawal of air from the low pressure receiver, from the cavity receivers and the receivers of the central bodies at different modes of rotation of the rotor of the wind energy device and for effective neutralization of the action of excessively high speeds of the wind on the rotor of the wind energy device, elements controlling the consumption of air are mounted on air lines.

6. The method according to claim 1, characterized in that the withdrawal of air is carried out by means of a turbine.

7. The method according to claim 1, characterized in that air is blown into the vortex rotating in the cavity of the blade.

8. A method of enhancing the effectiveness of operation of a rotor blade of a wind energy device, characterized in that suction withdrawal of air to the end of a blade is carried out from centrifugal forces of a rotating blade, and also because of pressure difference occurring at the blade shank and end of the blade because of the high sum speed of air at the end of the rotating blade, wherein the rotor blade is made in the form of a wing with a thick aerodynamic profile and a vortex system for control of the boundary layer, consisting of longitudinal cavities, is arranged on the rear part of the blade from the side opposite the wind.

9. The method according to claim 8, characterized in that from each cavity through air vents with elements controlling air consumption, suction withdrawal of air is carried out into the low pressure receiver, air from which due to centrifugal forces of a rotating blade and also due to pressure difference occurring at the blade shank and end of the blade as a result of a high sum speed of the air at the end of the rotating blade, is suction withdrawn to the end of the blade through an air line.

10. The method according to claim 8, characterized in that plates are mounted inside the cavity and on the outer surface of the blade to limit the air flow flowing off along the blade.

11. The method according to claim 8, characterized in that suction withdrawal of air is carried out by means of a turbine.

12. The method according to claim 8, characterized in that blowing air is carried out into the vortex rotating in the cavity of the blade.

* * * * *